United States Patent
Agrawal et al.

(10) Patent No.: US 9,578,373 B2
(45) Date of Patent: *Feb. 21, 2017

(54) REMOTE DISPLAY PERFORMANCE MEASUREMENT TRIGGERED BY APPLICATION DISPLAY UPGRADE

(71) Applicant: VMware, Inc., Palo Alto, CA (US)

(72) Inventors: Banit Agrawal, Sunnyvale, CA (US); Rishi Bidarkar, Sunnyvale, CA (US); Uday Kurkure, Los Altos Hills, CA (US); Tariq Magdon-Ismail, San Jose, CA (US); Hari Sivaraman, Livermore, CA (US); Lawrence Andrew Spracklen, Boulder Creek, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/150,119

(22) Filed: May 9, 2016

(65) Prior Publication Data

US 2016/0255400 A1    Sep. 1, 2016

Related U.S. Application Data

(63) Continuation of application No. 13/872,040, filed on Apr. 26, 2013, now Pat. No. 9,336,117.

(51) Int. Cl.
*G06F 15/173* (2006.01)
*H04N 21/442* (2011.01)
(Continued)

(52) U.S. Cl.
CPC ....... *H04N 21/4424* (2013.01); *G06F 11/3409* (2013.01); *G06F 11/3419* (2013.01);
(Continued)

(58) Field of Classification Search
CPC ..................................................... H04L 43/04
(Continued)

(56) References Cited

U.S. PATENT DOCUMENTS 5,933,155 A    8/1999   Akeley
6,168,431 B1   1/2001   Narusawa et al.
(Continued)

OTHER PUBLICATIONS

"Port Forwarding." Wikipedia. Published Feb. 15, 2010. Retrieved from the internet: URL<http://web.archive.org/web/20100215085655/http://en.wikipedia.org/wiki/Port_forwarding>. 3 pages.

(Continued)

*Primary Examiner* — David Lazaro
*Assistant Examiner* — Marie Georges Henry

(57) ABSTRACT

Methods, systems, and computer programs are provided for measuring the performance of display images received on a remote computer display. One method includes an operation for detecting calls from an application to an application programming interface (API), which is provided for rendering images on a display image, each call causing an update of the display image. Further, the method includes an operation for embedding data for measuring performance in display frames of the display image based on the detecting. The embedding results in modified displayed frames with respective data for measuring performance. The modified displayed frames are transmitted to a remote client, which results in received modified display frames having respective received data for measuring the performance. In addition, the method includes an operation for calculating the remote display quality for the given application based on the received modified display frames and the respective received data for measuring performance.

20 Claims, 9 Drawing Sheets

(51) Int. Cl.
*G06F 11/34* (2006.01)
*H04N 21/24* (2011.01)
*H04N 21/443* (2011.01)

(52) U.S. Cl.
CPC ..... *G06F 11/3495* (2013.01); *H04N 21/2402* (2013.01); *H04N 21/4431* (2013.01); *G06F 2201/815* (2013.01)

(58) Field of Classification Search
USPC .................................. 709/224, 246; 725/116
See application file for complete search history.

(56) References Cited

U.S. PATENT DOCUMENTS

| | | |
|---|---|---|
| 6,381,362 B1 | 4/2002 | Deshpande et al. |
| 6,421,678 B2 | 7/2002 | Smiga et al. |
| 6,618,431 B1 | 9/2003 | Lee |
| 6,876,390 B1 | 4/2005 | Nagata |
| 7,155,681 B2 | 12/2006 | Mansour et al. |
| 7,287,275 B2 | 10/2007 | Moskowitz |
| 7,532,642 B1 | 5/2009 | Peacock |
| 7,552,467 B2 | 6/2009 | Lindsay |
| 7,593,543 B1 | 9/2009 | Herz et al. |
| 7,752,325 B1 | 7/2010 | Yadav et al. |
| 7,796,978 B2 | 9/2010 | Jones et al. |
| 7,831,661 B2 | 11/2010 | Makhija et al. |
| 8,166,107 B2 | 4/2012 | Makhija et al. |
| 8,347,344 B2 | 1/2013 | Makhija et al. |
| 8,788,079 B2 | 7/2014 | Spracklen |
| 9,214,004 B2 | 12/2015 | Agrawal et al. |
| 2001/0023436 A1 | 9/2001 | Srinivasan et al. |
| 2002/0026505 A1 | 2/2002 | Terry |
| 2002/0056129 A1 | 5/2002 | Blackketter et al. |
| 2002/0138846 A1* | 9/2002 | Mizutani ................ H04H 60/21 725/93 |
| 2002/0165757 A1 | 11/2002 | Lisser |
| 2004/0022453 A1 | 2/2004 | Kusama et al. |
| 2004/0073947 A1 | 4/2004 | Gupta |
| 2004/0137929 A1 | 7/2004 | Jones et al. |
| 2004/0184526 A1 | 9/2004 | Penttila et al. |
| 2004/0221315 A1 | 11/2004 | Kobayashi |
| 2005/0041136 A1 | 2/2005 | Miyata |
| 2005/0138136 A1 | 6/2005 | Potter |
| 2005/0187950 A1 | 8/2005 | Parker et al. |
| 2005/0234715 A1 | 10/2005 | Ozawa |
| 2005/0283800 A1 | 12/2005 | Ellis et al. |
| 2006/0050640 A1 | 3/2006 | Jin et al. |
| 2006/0059095 A1 | 3/2006 | Akins, III et al. |
| 2006/0206491 A1 | 9/2006 | Sakamoto et al. |
| 2007/0003102 A1 | 1/2007 | Fujii et al. |
| 2007/0008108 A1 | 1/2007 | Schurig |
| 2007/0125862 A1 | 6/2007 | Uchiyama et al. |
| 2007/0126929 A1 | 6/2007 | Han et al. |
| 2007/0250920 A1 | 10/2007 | Lindsay |
| 2007/0271375 A1* | 11/2007 | Hwang ................ G06F 11/3419 709/224 |
| 2007/0291771 A1 | 12/2007 | Cline |
| 2008/0022350 A1 | 1/2008 | Hostyn et al. |
| 2008/0052783 A1 | 2/2008 | Levy |
| 2008/0075121 A1 | 3/2008 | Fourcand |
| 2008/0112490 A1 | 5/2008 | Kamijo et al. |
| 2008/0117937 A1 | 5/2008 | Firestone et al. |
| 2008/0204600 A1 | 8/2008 | Xu et al. |
| 2008/0212557 A1 | 9/2008 | Chiricescu et al. |
| 2008/0263634 A1 | 10/2008 | Kirkland |
| 2008/0297603 A1 | 12/2008 | Hurst |
| 2009/0100164 A1 | 4/2009 | Skvortsov et al. |
| 2009/0210747 A1 | 8/2009 | Boone |
| 2009/0216975 A1 | 8/2009 | Halperin et al. |
| 2009/0217052 A1 | 8/2009 | Baudry et al. |
| 2009/0259941 A1 | 10/2009 | Kennedy, Jr. |
| 2009/0260045 A1 | 10/2009 | Karlsson et al. |
| 2009/0268709 A1 | 10/2009 | Yu |
| 2010/0161711 A1 | 6/2010 | Makhija et al. |
| 2010/0162338 A1 | 6/2010 | Makhija |
| 2010/0246810 A1 | 9/2010 | Srinivasan et al. |
| 2010/0306163 A1 | 12/2010 | Beaty et al. |
| 2011/0023691 A1 | 2/2011 | Iwase et al. |
| 2011/0047211 A1 | 2/2011 | Makhija |
| 2011/0051804 A1 | 3/2011 | Chou et al. |
| 2011/0103468 A1 | 5/2011 | Polisetty et al. |
| 2011/0134763 A1 | 6/2011 | Medina et al. |
| 2011/0138314 A1 | 6/2011 | Mir et al. |
| 2011/0179136 A1 | 7/2011 | Twitchell, Jr. |
| 2011/0188704 A1 | 8/2011 | Radhakrishnan et al. |
| 2011/0224811 A1 | 9/2011 | Lauwers et al. |
| 2011/0238789 A1 | 9/2011 | Luby et al. |
| 2012/0036251 A1 | 2/2012 | Beaty et al. |
| 2012/0066711 A1 | 3/2012 | Evans et al. |
| 2012/0073344 A1 | 3/2012 | Fabris |
| 2012/0081580 A1 | 4/2012 | Cote et al. |
| 2012/0113270 A1 | 5/2012 | Spracklen |
| 2012/0140935 A1 | 6/2012 | Kruglick |
| 2012/0167145 A1 | 6/2012 | Incorvia et al. |
| 2012/0246225 A1 | 9/2012 | Lemire |
| 2014/0320673 A1 | 10/2014 | Agrawal et al. |
| 2014/0325054 A1 | 10/2014 | Agrawal et al. |
| 2014/0328203 A1 | 11/2014 | Spracklen |
| 2016/0098810 A1 | 4/2016 | Agrawal et al. |

OTHER PUBLICATIONS

Larsen, Vegard. *Combining Audio Fingerprints*. Norwegian University of Science and Technology, Department of Computer and Information Science. Published Jun. 2008. 151 pages.

\* cited by examiner

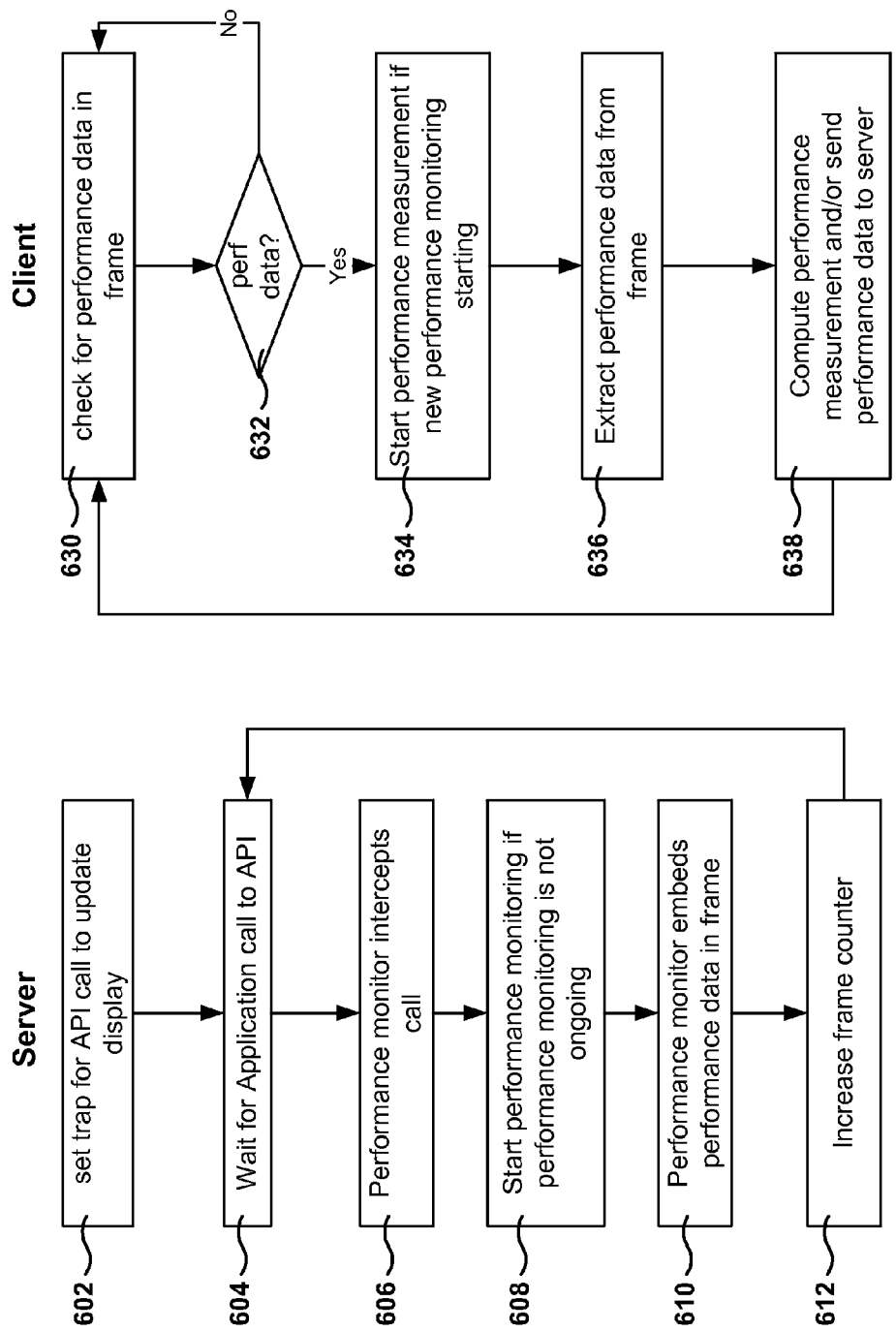

US 9,578,373 B2

REMOTE DISPLAY PERFORMANCE MEASUREMENT TRIGGERED BY APPLICATION DISPLAY UPGRADE

CROSS REFERENCE TO RELATED APPLICATIONS

This application is a continuation of and claims priority to U.S. patent application Ser. No. 13/872,040, filed on Apr. 26, 2013, the entire contents of which are hereby incorporated by reference. This application is related to U.S. Pat. No. 7,831,661, issued Nov. 9, 2010, and entitled "MEASURING CLIENT INTERACTIVE PERFORMANCE USING A DISPLAY CHANNEL;" U.S. Pat. No. 8,347,344, filed on Dec. 18, 2008, and entitled "MEASURING REMOTE VIDEO PLAYBACK PERFORMANCE WITH EMBEDDED ENCODED PIXELS;" U.S. application Ser. No. 12/942,393, filed on Nov. 9, 2010, and entitled "MONITORING AUDIO FIDELITY AND AUDIO-VIDEO SYNCHRONIZATION;" and U.S. application Ser. No. 13/079,972, filed on Apr. 5, 2011, and entitled "QUALITY EVALUATION OF MULTIMEDIA DELIVERY IN CLOUD ENVIRONMENTS," which are incorporated herein by reference for all purposes.

Further, this application is related by subject matter to U.S. patent application Ser. No. 13/872,036 filed Apr. 26, 2013, and entitled "MEASUREMENT OF REMOTE DISPLAY PERFORMANCE WITH IMAGE-EMBEDDED MARKERS," which is incorporated herein by reference.

BACKGROUND

In typical virtualized desktop infrastructure architectures, displays and input devices are local, and applications execute remotely in a server. Because applications execute remotely, a latency element is introduced due to the network travel time and the application response time. In Virtual Desktop Infrastructure (VDI) deployments, a user's desktop is typically hosted in a datacenter or cloud, and the user remotely interacts with her desktop via a variety of endpoint devices, including desktops, laptops, thin clients, smart phones, tablets, etc. There are many advantages to this approach, including cost savings, improved mobility, easier management and deployment of applications, etc. However, for VDI environments to become ubiquitous, the user should not be constrained in the type of application that can be successfully run. Accordingly, it is necessary to ensure that, when required, sufficient computational resources are made available in the data center, and, without comprising quality, there is sufficient network bandwidth to transmit the desired imagery and audio to the user's endpoint device. In order to ensure proper quality of delivery, it is necessary to automatically monitor video quality, audio quality, and the synchronization of audio and video.

SUMMARY

Embodiments of the present invention provide methods, systems, and computer programs for measuring the quality of a remote display coupled to a remote desktop client. It should be appreciated that the present embodiments can be implemented in numerous ways, such as a process, an apparatus, a system, a device or a method on a computer readable medium. Several inventive embodiments are described below.

In one embodiment, a method includes an operation for detecting calls from an application to an application programming interface (API), which is provided for rendering images on a display image. Each call causes an update of the display image. Further, the method includes an operation for embedding data for measuring performance in display frames of the display image based on the detecting. The embedding results in modified displayed frames with respective data for measuring performance. The modified displayed frames are transmitted to a remote client, which results in received modified display frames having respective received data for measuring the performance. In addition, the method includes an operation for calculating the remote display quality for the given application based on the received modified display frames and the respective received data for measuring performance.

In another embodiment, a system includes a processor and a memory. The memory includes a display management program, a remote display program, and a performance measurement program. The display management program, when executed by the processor, provides an application programming interface (API) provided for rendering images on a display image. Further, the remote display program, when executed by the processor, transmits the display image to a remote display. When the program instructions from the performance measurement program are executed by the processor, the program instructions cause the processor to: detect calls from an application to the API that causes an update of the display image; embed data for measuring performance in a plurality of display frames of the display image based on the detection; and calculate a remote display quality. The embedding results in a plurality of modified displayed frames with respective data for measuring performance. The calculation of the remote display quality for the application of the remote client is based on the received modified display frames with the respective received data for measuring performance.

In yet another embodiment, a computer program embedded in a non-transitory computer-readable storage medium, when executed by one or more processors, for measuring performance of a computer system is provided. The computer program includes program instructions for detecting calls from an application to an application programming interface (API) provided for rendering images on a display image, each call causing an update of the display image. In addition, the computer program includes program instructions for embedding data for measuring performance in a plurality of display frames of the display image based on the detecting, the embedding resulting in a plurality of modified displayed frames with respective data for measuring performance. The computer program further includes program instructions for transmitting the plurality of modified displayed frames to a remote client, the remote client receiving a plurality of received modified display frames with respective received data for measuring performance. The computer program further includes program instructions for calculating a remote display quality for the application at the remote client based on the received modified display frames and the respective received data for measuring performance.

In one embodiment, a method includes an operation for embedding in display frames a respective frame identifier and a respective frame picture. The respective frame picture is placed in a respective region that depends of the value of the respective frame identifier. Additionally, the method includes operations for sending the plurality of display frames to a remote client, and for extracting each received frame picture from the respective region of each received display frame at the remote client based on the received frame identifier. The received frame quality is calculated for each received display frame based on the comparison of the extracted received frame picture with the respective frame picture. Further, the method includes an operation for calculating a remote display quality for the remote client based on the calculated received frame quality for the received display frames.

In another embodiment, the system includes a processor and a memory. The memory includes a plurality of known images, a remote display program, and a performance measurement program. Each known image is associated with a respective frame identifier, and the remote display program, when executed by the processor, receives a display image for a remote display. Further, the program instructions from the performance measurement program, when executed by the processor, cause the processor to: extract from a plurality of display frames a respective frame identifier and a respective frame picture, the respective frame picture being extracted from a respective region in each display frame that is based on the respective frame identifier; calculate a received frame quality for each received display frame based on a comparison of the extracted received frame picture with a respective known image that is associated with the frame identifier; and calculate a remote display quality for the remote display based on the calculated received frame quality for the received display frames.

In yet another embodiment, the computer program includes program instructions for embedding, in a plurality of display frames, a respective frame identifier and a respective frame picture. The respective frame picture is placed in a respective region that is based on the respective frame identifier. In addition, the computer program includes program instructions for sending, after the embedding, the plurality of display frames to a remote client, and program instructions for extracting each received frame picture from the respective region of each received display frame at the remote client based on the received frame identifier. Further, the computer program includes program instructions for calculating a received frame quality for each received display frame based on a comparison of the extracted received frame picture with the respective frame picture that was embedded, and program instructions for calculating a frame rate quality based on the received frame identifiers. Further yet, the computer program includes program instructions for calculating a remote display quality for the remote client based on the calculated received frame quality for the received display frames and the frame rate quality.

Other aspects of the embodiments will become apparent from the following detailed description, taken in conjunction with the accompanying drawings, illustrating by way of example the principles of the embodiments.

BRIEF DESCRIPTION OF THE DRAWINGS

The embodiments may best be understood by reference to the following description taken in conjunction with the accompanying drawings in which:

FIG. 6A is a flowchart for embedding performance data at the server, according to one embodiment.

FIG. 6B is a flowchart for extracting the performance data at the client, according to one embodiment.

DETAILED DESCRIPTION

Methods, systems, and computer programs are presented for measuring quality of image delivery to a display connected to a remote desktop client. It should be noted, however, that the embodiments may be practiced without some or all of these specific details. In other instances, well known process operations have not been described in detail in order not to unnecessarily obscure the present embodiments.

The problem of measuring the quality of an image delivered to a remote client has been addressed using a range of tools, and analysis techniques. However, many of these tools rely on measuring the quality of video delivered to a remote display by comparing the video as received at the client with a master copy of the video. However, these types of performance measurements do not allow for the measurement of quality as applications running on a computing device change the display output. In addition, some existing solutions do not allow for the possibility that a Virtual Desktop Infrastructure (VDI) protocol may compress different regions of the desktop screen differently, thereby, necessitating measuring image quality across different regions of the screen. Embodiments presented herein provide solutions for measuring performance on-the-fly on a display that is changing because of changes made by applications running in the computing device.

Figure 1:
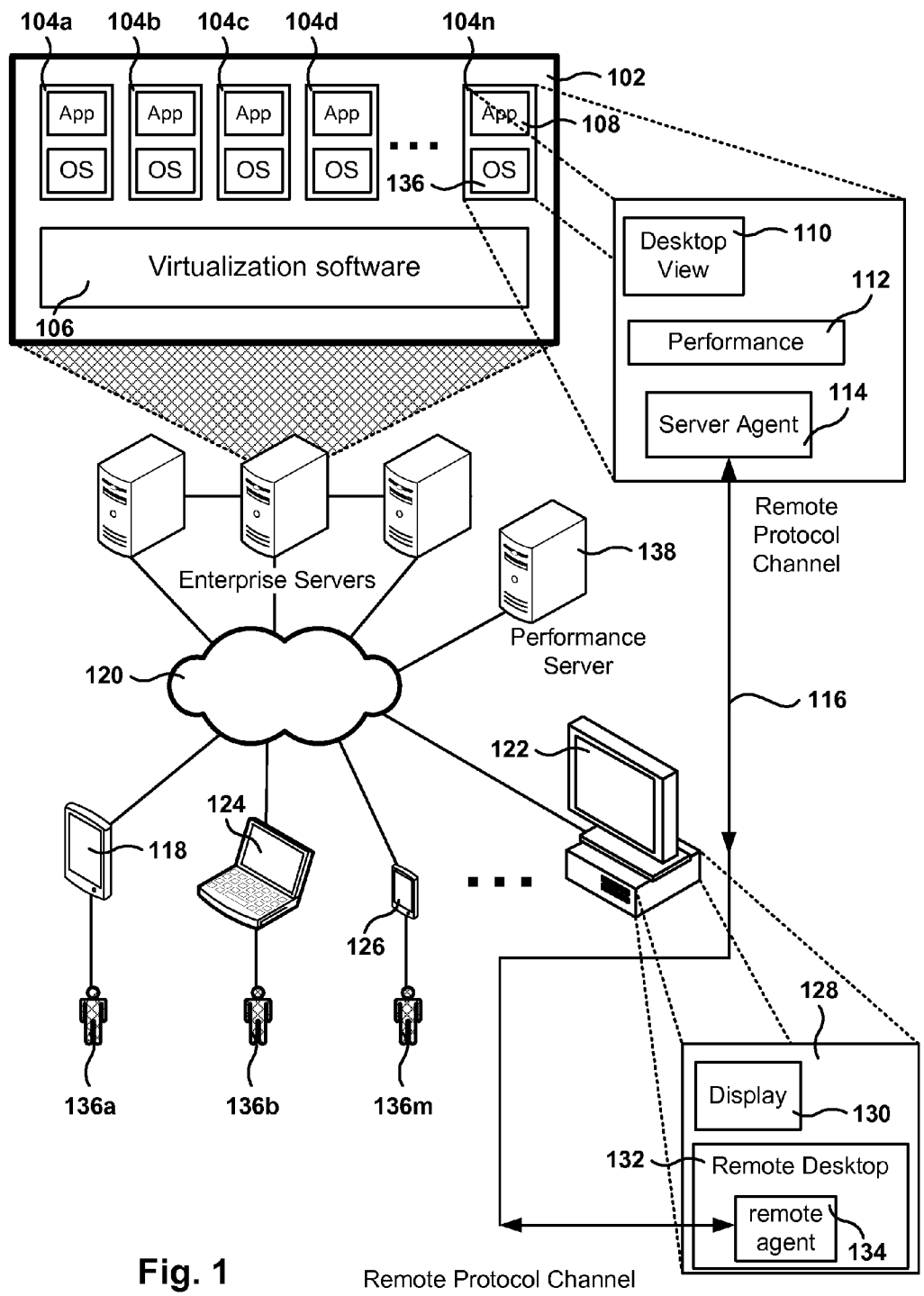
FIG. 1 depicts a remote desktop environment including virtual machine servers, according to one embodiment.

FIG. 1 depicts a remote desktop environment including virtual machine servers, according to one embodiment. The environment depicted in FIG. 1 includes enterprise servers 102 that provide virtual desktop services to remote users 136*a-m*. Although embodiments are described within a virtual desktop system, the embodiments presented can be used in other environments with a remote display application transmitting display data to a remote client.

In one embodiment, performance server 138 is also part of virtualization server 102, and can be implemented as a virtual appliance. Performance server 138 collects performance data from servers and clients and analyzes the data collected for presentation to a user. A simplified architecture of virtualization server 102 is shown in FIG. 1, with some components omitted for simplification purposes. A connection broker (not shown) manages the assignment of virtual machines (VM) 104*a*-104*n* in enterprise server 102 to remote users. Remote users 136*a*-136*m* are connected to computers 118, 122, 124 and 126 acting as clients in the virtual infrastructure. Computers 118, 122, 124 and 126 provide display presentation and input/output capabilities associated with virtual machines 104*a*-104*n*. Clients include tablet 118, PC 122, laptop 124, Personal Digital Assistance (PDA), mobile phone 126, etc. Clients communicate with virtualization server 102 via network 120.

Enterprise server 102 includes virtualization software 106, which is also sometimes referred to as a "hypervisor,"

and which manages physical resources of enterprise server 102 and emulates virtual hardware for each virtual machine 104a-104n. Virtual machines 104a-104n include a Guest Operating System (GOS) 136, which may be a commodity operating system such as Microsoft Windows, which supports applications 108 that run on the guest Operating System (OS). A different view of virtual machine 104n includes desktop view 110, performance module 112, and server agent 114. Server Agent 114 is a process executing in the VM that processes action requests from local client 128 and provides action start and completion times. On the other end, a local client 128 includes remote display 130, and a remote desktop environment 132 that includes a remote agent 134. Desktop view 110 may exist as a frame buffer (not separately shown) that corresponds to the graphical user interface display generated by the virtual machine. Display information for desktop view 110, which may vary according to the display protocol and include the entire contents of a frame buffer or updates (changes) to the frame buffer, or other display information such as drawing commands, primitives, and/or compressed video information such as macro block motion vectors (as known in the field of video compression) may be transmitted to remote display 130 at local client 128. The display information is received by remote agent 134 and remote desktop 132 updates remote display 130.

Virtual Machine 104n communicates with the associated local client over network 120 using a remote protocol, such as Remote Desktop Protocol (RDP) 116. In one embodiment, Remote Desktop Protocol 116 is a multichannel capable protocol that supports separate virtual channels for carrying presentation data, serial device communication, licensing information, highly encrypted data (keyboard, mouse activity), etc.

In some embodiments, the quality of the display images delivered to remote display 130 is measured. Additionally, the embodiments presented are independent of the communications protocols used to transfer display data, thus being able to reliably obtained performance measurements under different topologies and protocols and assess how different factors affect virtual desktop performance. Further still, the methods presented can scale to tens of thousands of clients and servers without unduly burdening the virtual infrastructure.

Figure 2:
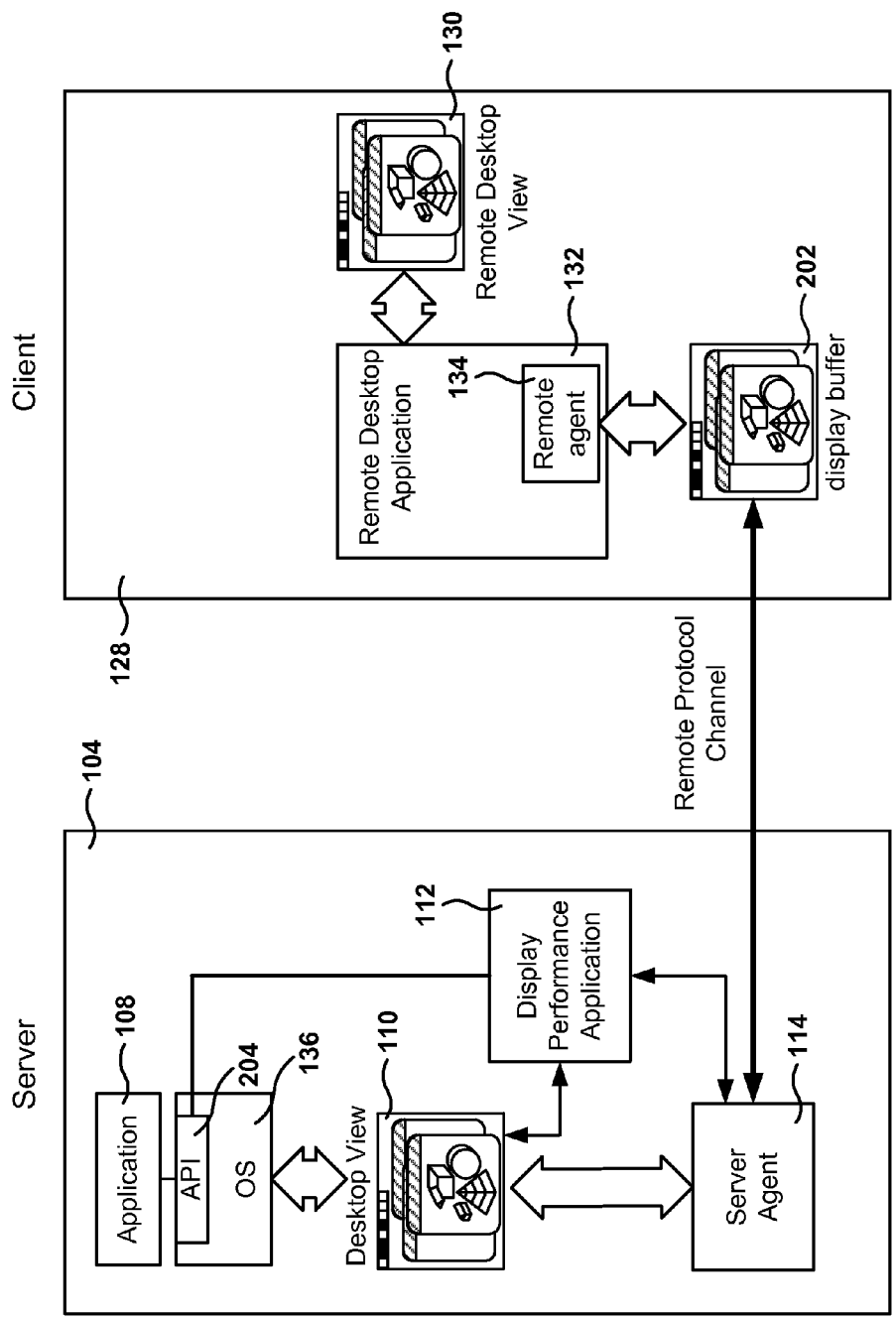
FIG. 2 shows an architecture for measuring display performance using information embedded on the display pixels, in accordance with one embodiment.

FIG. 2 shows an architecture for measuring display performance using information embedded on the display pixels, in accordance with one embodiment. Embodiments presented herein may be used in a plurality of situations with a plurality of applications, as the embodiments presented are not dependent on the type of application being run on the virtual machine.

In some embodiments, rendering API calls made on the VDI desktop by an application or performance benchmark program are intercepted, a watermark is inserted to identify the frame being rendered, and a small reference image is added. On the client-side, the inserted watermark and reference image are extracted and compared against the original to measure the remote display quality.

The inserted watermark is immune to compression and quantization errors to uniquely mark the identity of the frame being rendered. In some embodiments, the identity and the position at which the selected reference image is inserted are indexed to the number of the frame being rendered by the application or benchmark.

To measure performance of the remote display, server 104 notifies client 128 of particular events using a specific section of the screen. A specific area of the screen is designated to carry information in the form of encoded pixels that correspond to predefined messages. For example, the area can be a pixel, a square, a rectangle, a line, a circle, etc.

Initially, a call by application 108 to a graphics display API 204 is detected by the display performance application 112. For example, the display API call can be intercepted by display performance application 112 using known interception techniques, or display performance application 112 may subscribe to events raised by the operating system when the display API call is made. In one embodiment, the API is provided by the operating system (OS) 136, but the embodiments presented herein may be utilized with any API and any OS. The API call causes a change in the desktop view 110 for the virtual machine. The display performance application 112, after detecting the API call, inserts data for measuring performance in the desktop view 110 of the display frame, and then server agent 114 transmits the desktop view 110 to the remote client 128.

At the client 128 side, the remote desktop application 132 receives the display data and includes a remote agent 134, which interacts with the server agent 114 to receive display buffer 202 updates. The remote desktop application 132 provides the content of the display buffer 202 to display 130, which may be integrated with or connected to client 128.

In one embodiment, remote agent 134 determines when data for measuring performance has been embedded in the received display frames to measure the performance of the remote display. The data for measuring performance refers to any data inserted in pixels of a display image, the data being used for measuring the quality of the remote display. In one embodiment, the data for measuring performance includes a frame number encoded in pixels of the display frame, and a reference image also inserted in the display frame. It is noted that the embodiments described herein utilize a frame number encoded on the top part of the display image, and a reference image inserted in different parts of the display buffer. However, other embodiments may utilize different ways of inserting data for the purpose of measuring the quality of the remote display, such as objects inserted within the display image (e.g., a circle, a square, a line, etc.), frame numbers inserted in different parts of the display image, frame numbers encoded with different colors or with different pixel areas, etc. The embodiments illustrated herein should therefore not be interpreted to be exclusive or limiting, but rather exemplary or illustrative.

The results of the remote display quality measurement may be used by the administrators to improve system resource allocation. VDI stacks have become more complex, and bottlenecks may occur in different places, such as in the network, the encoding algorithm, the Graphics Processor Unit (GPU), or somewhere else. Further, the remote display quality may be acceptable for some functions, but not for other functions. For example, a clock on the desktop may be updating correctly, but a Computer Aided Design (CAD) application may not be performing well when manipulating 3D objects.

In addition, remote display quality measurements may be used by administrators to properly size their systems in order to support an adequate number of simultaneous users. The systems may be distributed over one or more servers, that provide virtual machines to a plurality of users that have a desktop, or some other computing device, to access a virtual machine instantiated on the one or more servers. A single server may be able to support a few users or many users (e.g., several to a hundred or so), depending on the resource availability (i.e., number and clock speed of CPU cores and GPUs, memory size, disk and networking throughput, etc.) of the server and the resource requirements of the users.

It is noted that, in one embodiment, the remote display quality is calculated at the client 128 based on the intercepted data for measuring performance. In another embodiment, the remote agent 134 sends data to the display performance application 112 at the server 104, and the display performance application 112 makes the necessary calculations for obtaining a value for the remote display quality. In addition, it is also possible that the remote agent 134 and the display performance application 112 cooperate to obtain the remote display quality, where some of the calculations are performed at the remote agent 132 and some calculations may be performed at the display performance application 112.

The remote display quality may be expressed in several ways. For example, the remote display quality may include one or more of a received frame rate, a percentage of received frames, an image quality of the display, time required to receive remote display updates, etc., or any combination thereof.

In one embodiment, the process to enable measurement of the remote display quality may be started by an administrator, by request of a user, by request of a test script that is periodically executed, etc. In one embodiment, the measurement initialization process includes setting up the mechanism for intercepting one or more calls that update the display. The initialization process also includes starting the remote agent in the client that will intercept the received display frames. Therefore, the actual measurement of the remote display performance will begin when the first call is made to a trapped function that updates the display.

Typically, for benchmark performance measurements, a single application is executed at the virtual machine, preferably in full-screen mode, and calls made by the application to update the display are trapped or intercepted to modify the display frames, before they are sent to the remote display. If a performance measurement is started while more than one application is executing, and only one of the applications is being monitored, it can be the case that some updates to the display are not modified before being sent to the remote client because the updates are created by an application that is not being monitored. In this case, it is possible that some frames sent to the remote display have performance markers while other frames do not. In one embodiment, the performance markers are inserted in the window of the application that is being monitored, but in other embodiments the performance markers may be embedded elsewhere in the screen (e.g., in a desktop area not covered by a window associated with an application).

In addition, the time periods allocated for measuring performance may vary. For example, a performance test may take one second, 10 seconds, 1 minute, 10 minutes, a day, etc. Further yet, the end of the performance test may be indicated by a request to end the performance test, such as when an administrator or a user selects an option to end the test. Additionally, the performance test may end after a predetermined amount of time, or after a predetermined number of display frames have been sent to the remote client, etc.

For example, an administrator may ask a user to press a key on the keyboard (e.g., F11) which causes the performance measurement to start. After a while, if the user presses the same key again (or another key) to stop the test, then the administrator may examine a performance log or some other saved data, to assess the quality of the remote display.

It is noted that the embodiments illustrated in FIG. 2 or otherwise described herein are exemplary. Other embodiments may utilize different modules or combine the functionality of several modules, etc. The embodiments illustrated in FIG. 2 should therefore not be interpreted to be exclusive or limiting, but rather exemplary or illustrative.

Figure 3:
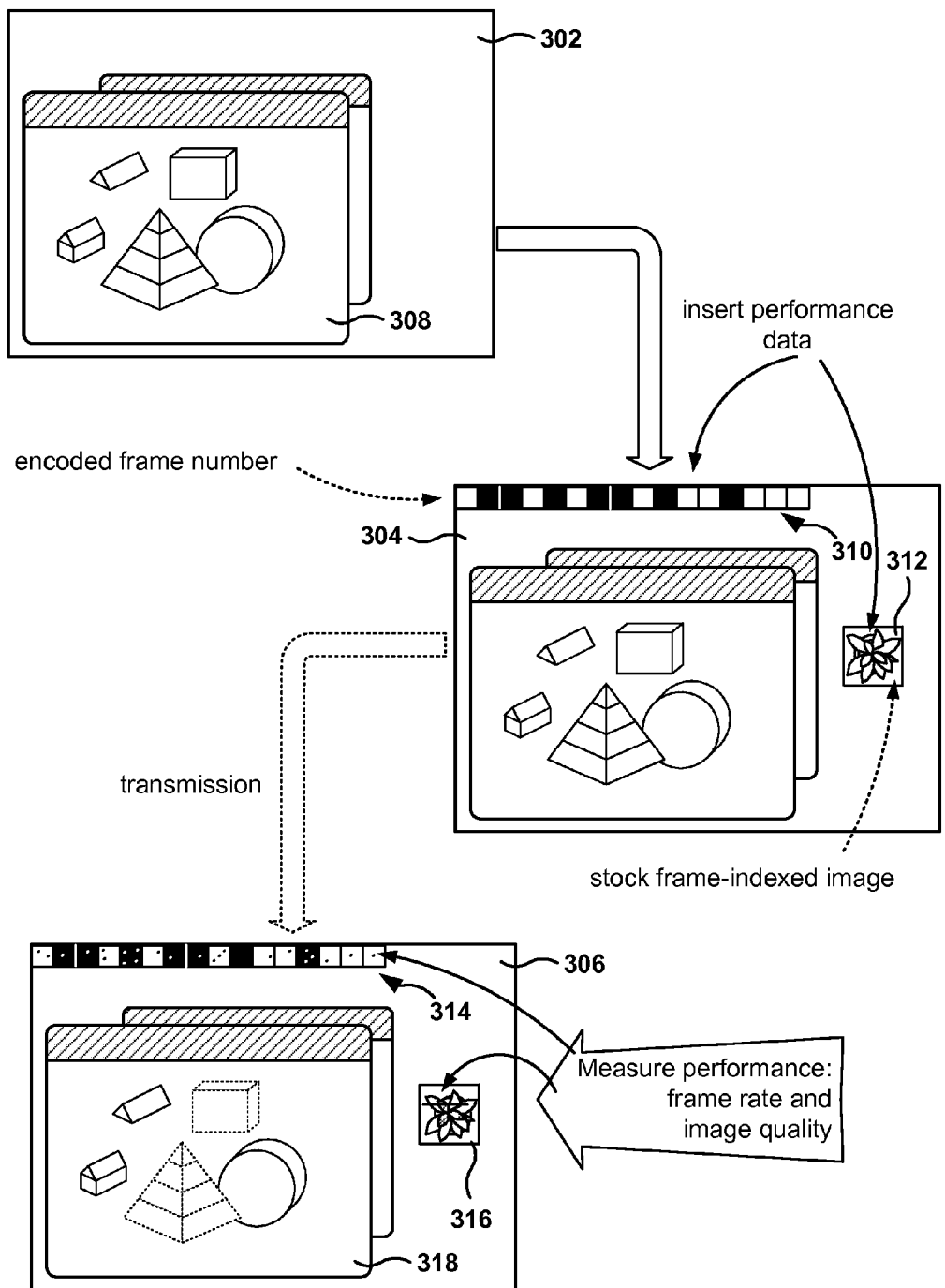
FIG. 3 illustrates the embedding of data for measuring performance in display frames, according to one embodiment.

FIG. 3 illustrates the embedding of data in display frames for measuring system performance, according to one embodiment. Display frame 302 shows a snapshot of a display frame that is to be transmitted to a remote display coupled to a remote client. For purposes of illustration, display frame 302 includes a window 308 associated with an application executing on the virtual machine. For example, the application may be a CAD Application, a word processing application, a spreadsheet, a game, a video rendering application, etc. that is currently being accessed by a user.

When a performance measurement trigger is activated, performance data is inserted in display frame 302, resulting in modified display frame 304. In one embodiment, the trigger to start measuring performance is a detected call to a graphics API, but other triggers are also possible, such as a user input (e.g., via keyboard, mouse, voice, touch, gesture, etc.), an administrator input, a performance benchmark program instruction, etc.

After detecting the call to the API, a performance frame identifier, also referred to herein as a watermark or a frame counter, is inserted in the display frame. This insertion is performed on-the-fly in real time. In other words, the test may be performed during actual use of the system by a user without predetermined frame contents or user activity as would be the case for an automated test. Thus, one implementation is to obtain the remote display quality or performance metric for the VDI client while an arbitrary application or benchmark is executing.

In one embodiment, the modified display frame 304 includes two types of embedded data for measuring performance: a frame identifier 310 and a frame picture 312. In one embodiment, the frame identifier or watermark 310 is inserted on the top left section of the display, but other embodiments may place the watermark in other areas of the display (e.g., top right corner, bottom left corner, etc.). The frame identifier is encoded as a set of tiles, each tile representing a bit of the frame identifier.

In one embodiment, each tile is 16×16 pixels in size, but other sizes are also possible. For example, the tiles may have sizes in pixels of 4×4, 4×8, 8×8, 4×16, 8×16, 32×32, 64×64, etc. In one embodiment, to encode a binary value, each pixel in the tile is assigned the same color value, the pixels having a first value to encode a binary 0 and having a second value, different from the first value, to encode a binary 1. For example, a binary 0 may be encoded as a black tile while a binary 1 may be encoded as a white tile, but other color values are also possible as long as they provide enough contrast between the two color values. By using a plurality of pixels for each encoded bit, the binary value should reliably survive even aggressive image compression and resulting image distortions caused by compression artifacts.

In one embodiment, the tiles are placed horizontally adjacent to each other. In other embodiments, the tiles may be placed vertically, diagonally, or in any other disposition, as long as the client and the server use the same scheme for placing the tiles. Further, in one embodiment, not all the tiles are placed adjacent to each other (e.g., 4 tiles may be placed in each of the corners, etc.).

After starting the performance measurement, each of the display frames to be transmitted to the remote client are encoded with the frame identifier, the frame identifier acting as a frame counter, where each frame has a value equal to the value of the previous frame plus 1.

In addition to the frame identifier, a frame picture 312 is inserted in the modified display frame 304. In one embodiment, the frame picture 312 changes on every frame. In addition, the location of the frame picture 312 also changes in every frame. The image inserted and the location of the frame picture 312 may be based on the frame number so that the agent at the client can determine where the frame picture is supposed to be situated after decoding the frame identifier. Also, the remote agent is able to determine which frame picture 312 was inserted based on the received frame identifier. For example, the frame image and location may be specified in a table that associates a particular image and image location with the value of the last 8 bits of the frame number, the last two digits after converting to decimal notation, or some other value derived from the frame number, e.g., using a cryptographic hashing algorithm.

After the display frame has been modified, the modified display frame 304 is transmitted to the remote client. The remote client receives the display frame, which is referred to herein as the received modified display frame 306, because it corresponds to the original display frame after being modified and as received by the client. The received modified display frame 306 may be different from the modified display frame 304 due to alteration during transmission. For example, some of the pixels may have changed due to noise or a display frame may have been dropped by the network.

The received modified display frame 306 includes a received frame identifier 314 and a receive frame picture 316, as well as some of the other display elements, such as received application window 318. At the received client, the display quality is measured based on the received frame identifier 314 and the receive frame picture 316. In some other embodiments, the information is transmitted to the server and the performance calculations are performed by the server.

As discussed above, the received modified display frame may include noise artifacts resulting from image compression. To extract the frame identifier, the agent examines each of the tiles and assigns a binary value of zero or one based on the predominant pixel value within the tile. For example, a tile with 80% or 90% black pixels would be assumed to be a black tile, etc.

After extracting the value of the binary encoded frame counter by joining together all the binary values for each of the tiles, the agent calculates the position of the expected received frame picture, which is based on the extracted frame counter. For example, the frame identifier with a binary value of 00110001 is associated with a location of (350, 75) as measured in pixels with reference to the top left corner. This location identifies the top left corner of the inserted picture. In other embodiments, other types of coordinates and positions may be used, as long as both the client and the server use the same protocol to identify the location and identity of the frame pictures. Further, the size of the frame pictures may vary according to different embodiments. In some embodiments, the frame picture may have sizes of 10×10 pixels, 20×20 pixels, 32×32, 100×100 pixels, 100×50, etc.

From the extracted frame identifier, the identity of the received frame picture may be determined. In one embodiment, the client and the agent share an image identity table with at least three columns: frame number, image identity, and image location. Once the frame number is identified, the image identity table is indexed by the frame number to determine the picture that was inserted at the server and the location where it was inserted.

The received frame picture 316 is compared to the "golden" copy (e.g., the perfect copy that was inserted at the server), also referred to herein as the reference copy. In one embodiment, by having the reference image location and/or identity change in every frame, the transmission protocols are not able to cache this image in order to avoid retransmitting the image. Under perfect conditions, the image must be sent with every frame update because the image is not in the previous display frame.

There are different methods for calculating the image quality based on the comparison between the received and the golden copy. In one embodiment, the Peak Signal-to-Noise Ratio (PSNR) is used. PSNR defines the ratio between the maximum possible power of a signal and the power of corrupting noise that affects the fidelity of its representation. Because many signals have a very wide dynamic range, PSNR is usually expressed in terms of the logarithmic decibel scale. PSNR is defined via the mean squared error (MSE). Given a noise-free m×n monochrome image I and its noisy approximation K, MSE is defined as:

$$MSE = \frac{1}{mn}\sum_{i=0}^{m-1}\sum_{j=0}^{n-1}[I(i,j)-K(i,j)]^2$$

PSNR is defined as:

$$PSNR = 10 \cdot \log_{10}\left(\frac{MAX_I^2}{MSE}\right)$$
$$= 20 \cdot \log_{10}\left(\frac{MAX_I}{\sqrt{MSE}}\right)$$
$$= 20 \cdot \log_{10}(MAX_I) - 10 \cdot \log_{10}(MSE)$$

Where $MAX_I$ is the maximum possible pixel value of the image. For color images with three RUB values per pixel, the definition of PSNR is the same except the MSE is the sum over all squared value differences divided by image size and by three.

In other embodiments, other methods may be utilized, such as Data Compression Ratio, the Perceptual Evaluation of Video Quality (PEVQ), Signal-to-Noise ratio (S/N), Structural Similarity (SSIM), etc. These and other image quality metrics are well known in the field, the use of any of which suitable ones is contemplated.

The image quality for the display frames is measured while an application is executing, which allows the administrator to better understand the quality of image delivery for a given application. Other approaches to measure image quality use stock images that are displayed either before or after an application runs, but not while the application is running. Further, since the position is indexed by the value of the frame counter, it is possible to avoid being favored or penalized by compression schemes that may favor or penalize particular regions of the screen.

In addition, the reference image is indexed utilizing the frame counter, which enables the measurement of image quality using different types of images (e.g., an image in black and white, an image with a limited number of colors, an image with a great variety of colors, and image where the colors change rapidly between adjacent pixels, an image where the colors change gradually between adjacent pixels, etc.). This flexibility allows obtaining remote display quality measurements that are not tilted towards one particular application type.

The quality metrics also includes a received frame rate which identifies the percentage of number of frames sent by the server that are received at the client. In one embodiment, the same reference image is inserted in a plurality of consecutive display frames in the same location. By having the same picture in several frames, it is possible to determine how well the remote display protocol reacts to changes in the display. For example, it may take an average of three frames before the received image obtains a predetermined level of quality. If the number of frames is small, the user's perception will be that the display image updates quickly and with precision. This allows the network administrator to determine what an acceptable lag for updating the remote display is.

In one embodiment, the obtained performance measurements may be used to display an icon on the display (not shown) that informs the user of the level of quality of the remote display. For example, the remote display icon may include 7 bars, and the number of displayed bars depends on the current remote display quality. In one embodiment, the remote display quality is calculated periodically (e.g., every 30 seconds, although other values are also possible) and the icon is updated accordingly.

It is noted that the embodiments illustrated in or described with reference to FIG. 3 are exemplary. Other embodiments may utilize different types of data for measuring performance, different number of tiles, different locations for the encoded frame number and inserted image, etc. The embodiments illustrated in FIG. 3 should therefore not be interpreted to be exclusive or limiting, but rather exemplary or illustrative.

Figure 4:
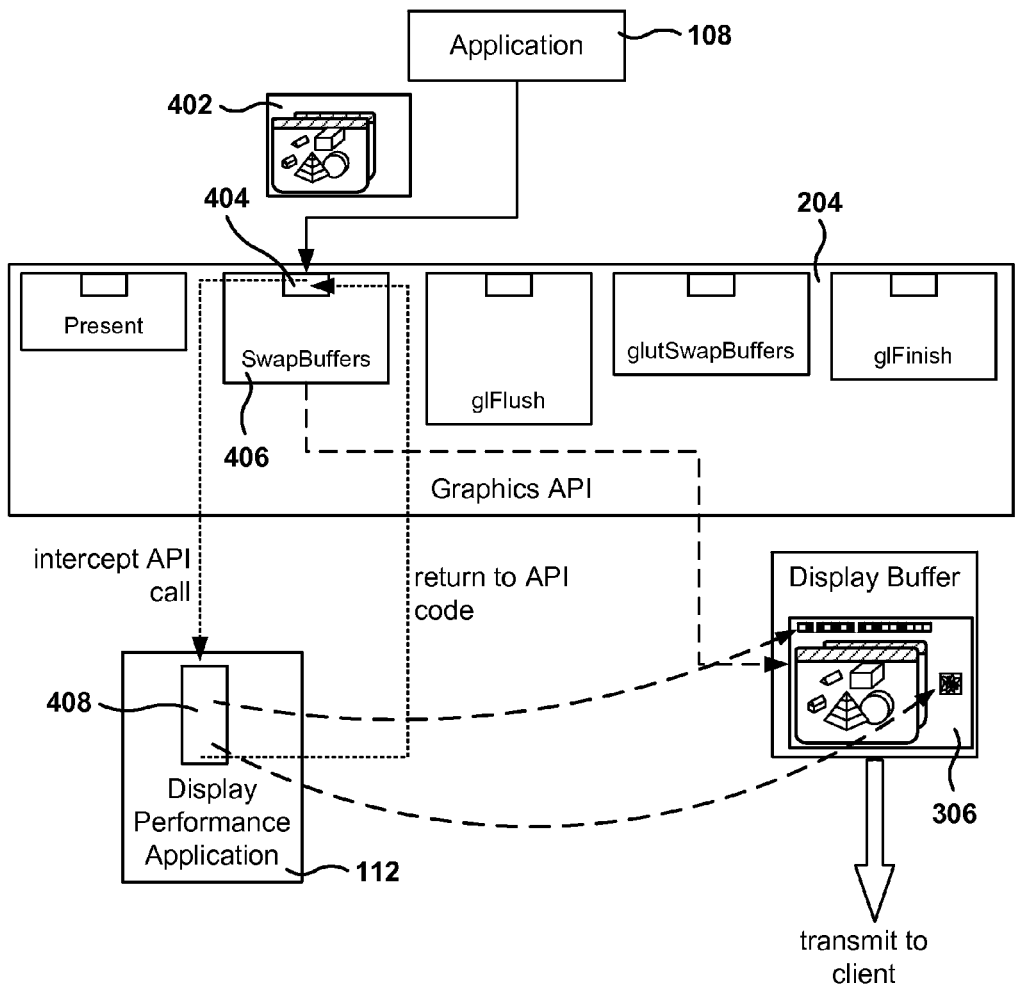
FIG. 4 illustrates how to embed performance data in display frames by trapping a call to an Application Programming Interface (API), according to one embodiment.

FIG. 4 illustrates a mechanism for embedding performance data in display frames by trapping a call to an Application Programming Interface (API), according to one embodiment. In one embodiment, the operating system provides one or more graphics APIs 204 for updating the display image. Each API provides one or more functions 406 that may be called by the applications to update the display image. The display performance application 112 traps one or more, or all, of the API calls that may cause an update to the display image, in order to embed data in the display frames to measure performance of the remote display quality.

Embodiments perform real-time watermark insertion based on the APIs selected for measuring display quality. The watermarks and the reference images are inserted in real-time on the display frames, before the VDI encodes the data.

Before starting the performance measurement operation, the graphics API, or a subset of the calls within the graphics API, are trapped, which means that when a call is made to a trapped API call, control is transferred to the display performance application 112. When control is transferred, the display performance application 112 performs the necessary operations to enable the system to measure the performance of the display on the remote client (e.g., inserting a frame identifier and a reference image into a frame buffer).

In one embodiment, application 108 makes a call 406 to the graphics API 204. The API call causes an update of display image 402, within a frame buffer that contains graphical display data. The trap created for the API call causes a transfer to the display performance application 112, and the performance program 408 executing in therein, to perform the required insertion of data into the frame buffer for performance measurement. Afterwards, the display performance application 112 returns control to the graphics API to perform the requested display operation. The result is a modified display frame 306, which is then transmitted to the client, as discussed previously with reference to FIG. 3.

In one embodiment, trapping the API call includes setting a software "trampoline" 404. Broadly speaking, trampoline 404 provides a software mechanism for inserting additional instructions into an existing instruction stream. The trampoline includes the replacement of an initial part of the program instructions associated with the API function 406. In its place, a jump instruction is inserted to transfer control to the performance program 408, also referred to as the API interceptor. After the performance program 408 executes the required operations for setting up performance measurements, the performance program 408 executes the instructions that were removed from the API call, and then executes the jump back to the API code and continue the execution of the API call. The trampoline may be inserted by display performance application 112 or server agent 114 (FIG. 1).

Embodiments presented herein may utilize any type of API call interception or trap, such as utilizing a proxy-dB, code-overwriting or detouring, modifying the "import address table," modifying an interrupt handler, etc. The only requirement is the performance program 408 is invoked when the API call is made. In another embodiment, a notification is sent to the performance program 408, while allowing the API call to be executed. The performance program may take appropriate action in order to execute the operations required to set up the performance monitoring operation. For example, the performance program 408 may "freeze" the program instructions of the API call until the performance program 408 finishes the set up for the monitoring operation. In summary, any method or device may be used as long as the performance program is able to set up the monitoring operation when the API call is made.

In one embodiment, OpenGL graphics API is used while running a version of the Windows operating system, and several calls are trapped, including "Present", "SwapBuffers", "glFlush", "glutSwapBuffers", and "glFinish." For example, the SwapBuffers function exchanges the front and back buffers if the current pixel format for the window referenced by the specified device context includes a back buffer. The syntax is:

BOOL WINAPI SwapBuffers(HDC hdc);

Where HDC specifies a device context. In another embodiment, calls to the DirectX API are trapped. Any type of display update call may be trapped or intercepted by the display performance application 112. The API interceptor keeps track of the frame number being rendered. The count of frame numbers begins with the first frame rendered when the API interception took place. It is noted that the process of intercepting the API call and inserting data for measuring performance is a low-overhead process, and does not unnecessarily perturb the system being monitored.

Since the performance data is inserted in response to a call by an application (e.g., a three-dimensional CAD application) it is possible to calculate an accurate performance benchmark for the given application. For example, if the performance measurements are performed independently from application calls, display updates may include other data being updated in the display, such as a desktop clock, an email notification message, a calendar event pop-up, etc.

The performance measurements are performed on-the-fly, and the performance quality metric is obtained. In one embodiment, the performance quality metric includes the received frame rate and the quality of the images received at the client. The user or the administrator are able to see how the system reacts to changes by the CAD application when the CAD application is interacting with the user. The CAD application is an example, and embodiments may be practiced with other applications, such as a word processor, a spreadsheet, a web browser, a video rendering application, etc.

The performance metrics are also useful for sizing the resource requirements for a system. For example, an administrator may be rolling out a new CAD application to 50 users. The performance metrics allow the administrator to determine what are the resources (number of servers, processors, graphics processors, memory, network bandwidth, etc.) required to support all the users.

Figure 5:
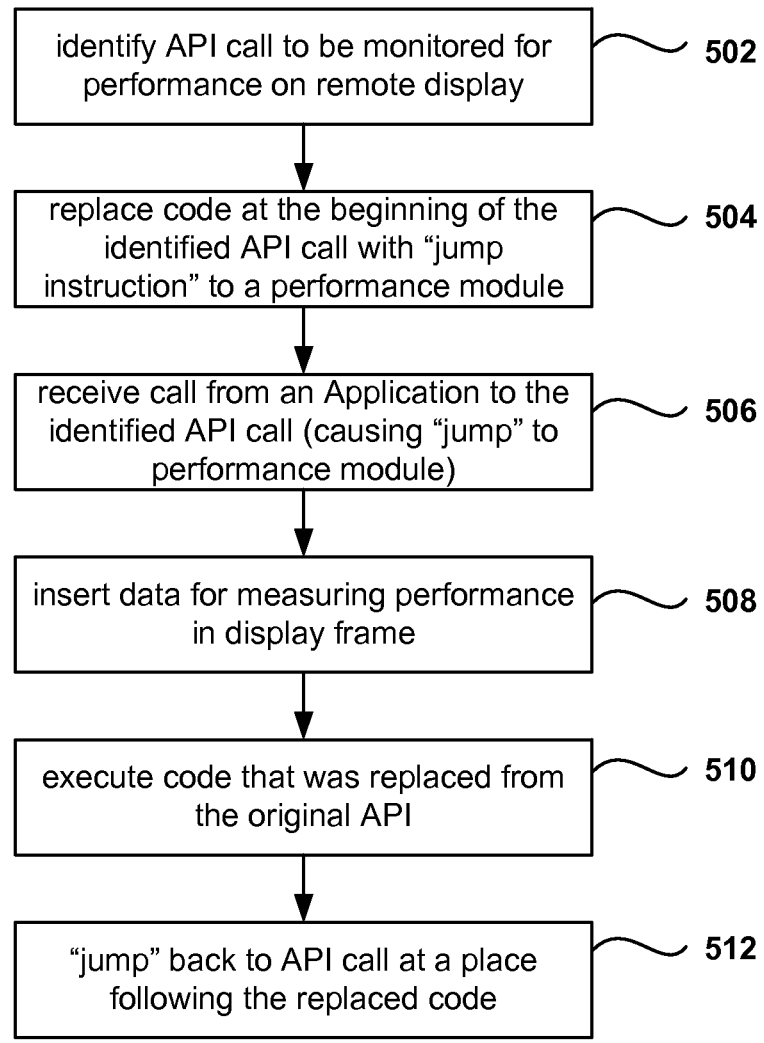
FIG. 5 is a flowchart for trapping a call to the API, according to one embodiment.

FIG. 5 is a flowchart for trapping a call to the API, according to one embodiment. In operation 502, an API call to be monitored is identified. The API-call trap is used to measure performance on a remote display attached to a remote client. From operation 502, the method flows to operation 504, where the API call identified in operation 502 is trapped. In one embodiment, the code at the beginning of the API call is replaced with a jump instruction to a performance module program, but other embodiments may use other software traps.

From operation 504, the method flows to operation 506 where a call is received from an application for the identified API call. This API call causes the jump instruction to be executed and the program instructions for the performance module to start being executed.

From operation 506, the method flows to operation 508 where data for measuring performance is inserted in a display frame associated with the API call of operation 506. In one embodiment, this insertion includes embedding a frame identifier and a reference image in the display frame. From operation 508, the method flows to operation 510 where the code that was replaced in operation 504 is executed.

From operation 510, the method flows to operation 512 where a jump back instruction is executed to transfer program control to the API call at the place that follows the code that was replaced in operation 504. It is noted that the method described with reference to FIG. 5 is exemplary. Other methods may utilize other forms of trapping calls to an API call, as described above with reference to FIG. 4.

FIG. 6A is a flowchart for embedding performance data at the server, according to one embodiment. In operation 602, a trap is a set for trapping calls to an API call (or calls), where the API call causes an update of the display in a remote client.

From operation 602, the method flows to operation 604 where the performance program monitor waits for a call from an application to the API call that was trapped in operation 602. In operation 606, the performance monitor intercepts the API call made by the application. From operation 606, the method flows to operation 608 where performance monitoring is started if the performance monitoring is not already in process. For example, if the performance monitoring is beginning (i.e., the performance monitoring is starting with this intercepted call), the frame number is reset to an initial value (e.g., 0 or 1) in order to start counting the embedded frame numbers that will be transmitted to the remote display.

From operation 608, the method flows to operation 610 where the performance monitor embeds performance data in the display frame that will be sent to the remote display. From operation 610, the method flows to operation 612 where the frame counter is increased so when the next API called is trapped the next display frame sent will have a correct value. Of course, in another embodiment, the frame counter may be increased before sending the display frame instead. The frame counter is increased each frame. In one embodiment, the frame counter starts at one in the first frame and is increased by one in each successive frames. From operation 610, the method flows back to operation 614 to continue trapping API calls and embedding performance data in successive display frames.

In one embodiment, the user determines the start of the performance monitoring operation, and in another embodiment an administrator, or a performance benchmark program, determines the start. For example, scripts may be used to automate the performance monitoring process, where the scripts may be run periodically as determined by the configuration of the performance monitoring system.

FIG. 6B is a flowchart for extracting the performance data at the client, according to one embodiment. At the client, in operation 630 a check is made to determine if a received display frame includes embedded data for measuring performance (e.g., a frame counter encoded in groups of pixels placed in a known location of the display frame).

From operation 630, the method flows to operation 632 where a check is made to determine if performance data was found in the last received frame. If the performance data was not found, the method flows back to operation 630, and if the performance data was found then the method flows to operation 634.

In operation 634, the performance measurement process is started at the client if there isn't an already-started performance monitoring process taking place. In operation 636, the performance data is extracted from the frame (e.g. frame identifier and reference image). From operation 636, the method flows to operation 638 where one or more performance metrics are calculated based on the extracted performance data. In another embodiment, the extracted performance data is sent to the server, and the server calculates the performance metrics (e.g., frame rate and image quality). The performance calculations may be done at any received frame, every certain number of frames, or periodically (e.g., every minute). For example, the image quality of the received inserted image may be calculated. In one embodiment, the agent at the client keeps ongoing statistical values of the progression of the remote display quality. In addition, statistical values of the received frame rate may also be tracked.

On the server side, the performance monitoring ends when the administrator, or some other actor (e.g., a command from an automated script, a user), requests the termination of the performance measurement to the display performance application. On the client side, the performance monitoring may also end when the administrator sends a command to the remote agent indicating the termination of the performance measurement. In one embodiment, if the performance measurement has been initiated by an automated script (e.g., via View Planner tool), a separate channel is used to notify the client that the operation has ended. Additionally, the performance monitoring may also be terminated after a certain amount of time, manually by a command entered on the virtual machine, after a certain number of modified frames have been received, when the application executed in the virtual machine ends, when no modified display frames are received for a threshold period of Lime (i.e., timeout), or under some other condition established by the administrator.

Figure 7A:
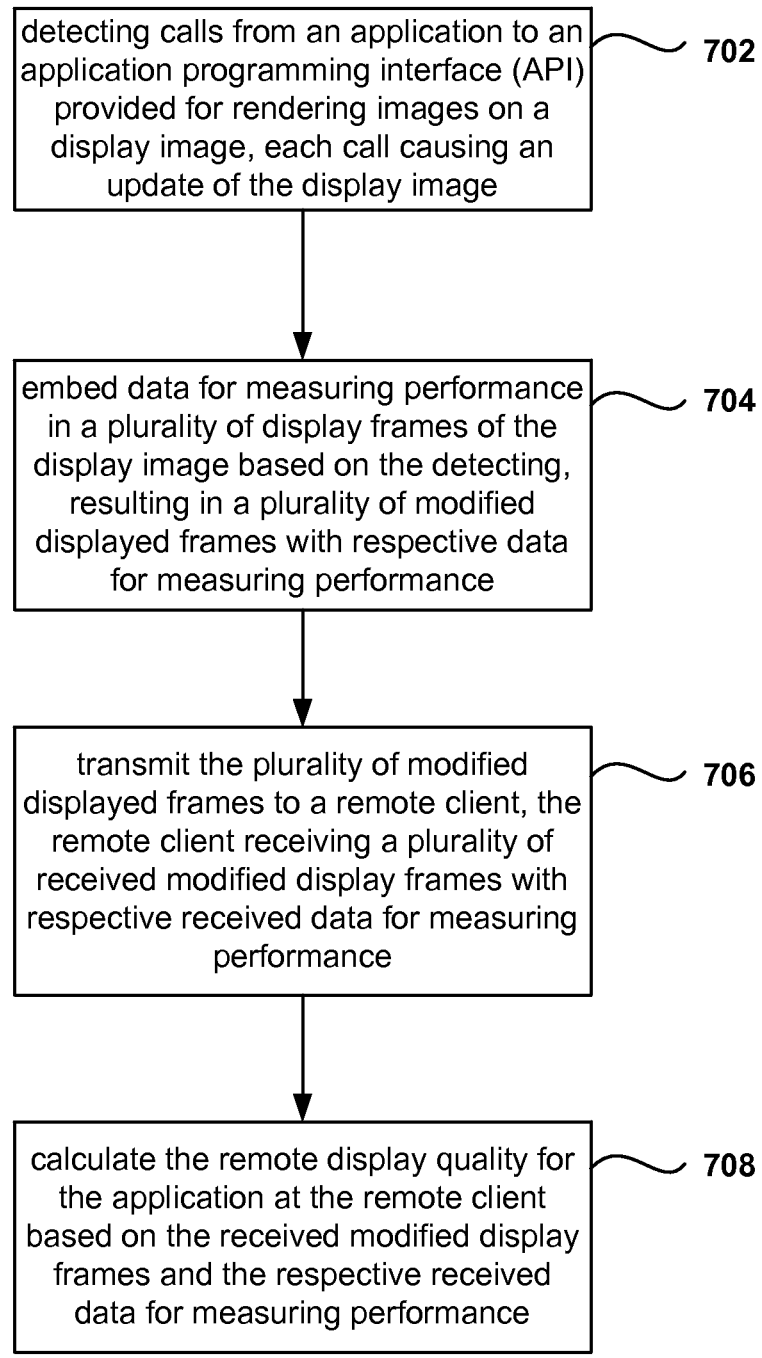
FIG. 7A is a flowchart for measuring performance of a remote display, according to one embodiment.

FIG. 7A is a flowchart for measuring performance of a remote display, according to one embodiment. In operation

702, calls, from an application to an API provided for rendering images on a display image, are detected, where each call causes an update of the display image for the remote display.

From operation 702, the method flows to operation 704 where data for measuring performance is embedded in a plurality of display frames of the display image based on the detecting. The embedding of the data for measuring performance results in a plurality of modified displayed frames (having respective data for measuring performance).

From operation 704, the method flows to operation 706 where the plurality of modified displayed frames is transmitted to the remote client. The remote client receives the plurality of received modified display frames, each received modified display frame having respective received data for measuring performance.

From operation 706, the method flows to operation 708 where the remote display quality for the application is calculated. The calculation is performed at the remote client based on the received modified display frames and the respective received data for measuring performance. In one embodiment, the operations of the method are executed by a processor.

The embodiments presented herein may be utilized by the administrator to assess the trade-offs between the received frame rate and the received quality of the display. For example, could the display quality improve if the frame rate was lowered? For example, transmitting 30 frames a second may result in better perceived quality than transmitting 60 frames a second, if fewer display frames get lost due to the lower bandwidth utilization.

In one embodiment, a self-learning program is used to dynamically adjust system resources based on the measured remote display performance. For example, the self-learning program may increase the network bandwidth when the remote display quality is below a predetermined threshold. The program then monitors the improvement in quality after the network bandwidth increase to identify the correlation between network bandwidth and remote display quality. Further, the monitoring program may adjust other system resources, such as number of virtual machines per server, number of processors, etc. In addition, the monitoring program may migrate a virtual machine from one server to another in order to avoid congestion.

Figure 7B:
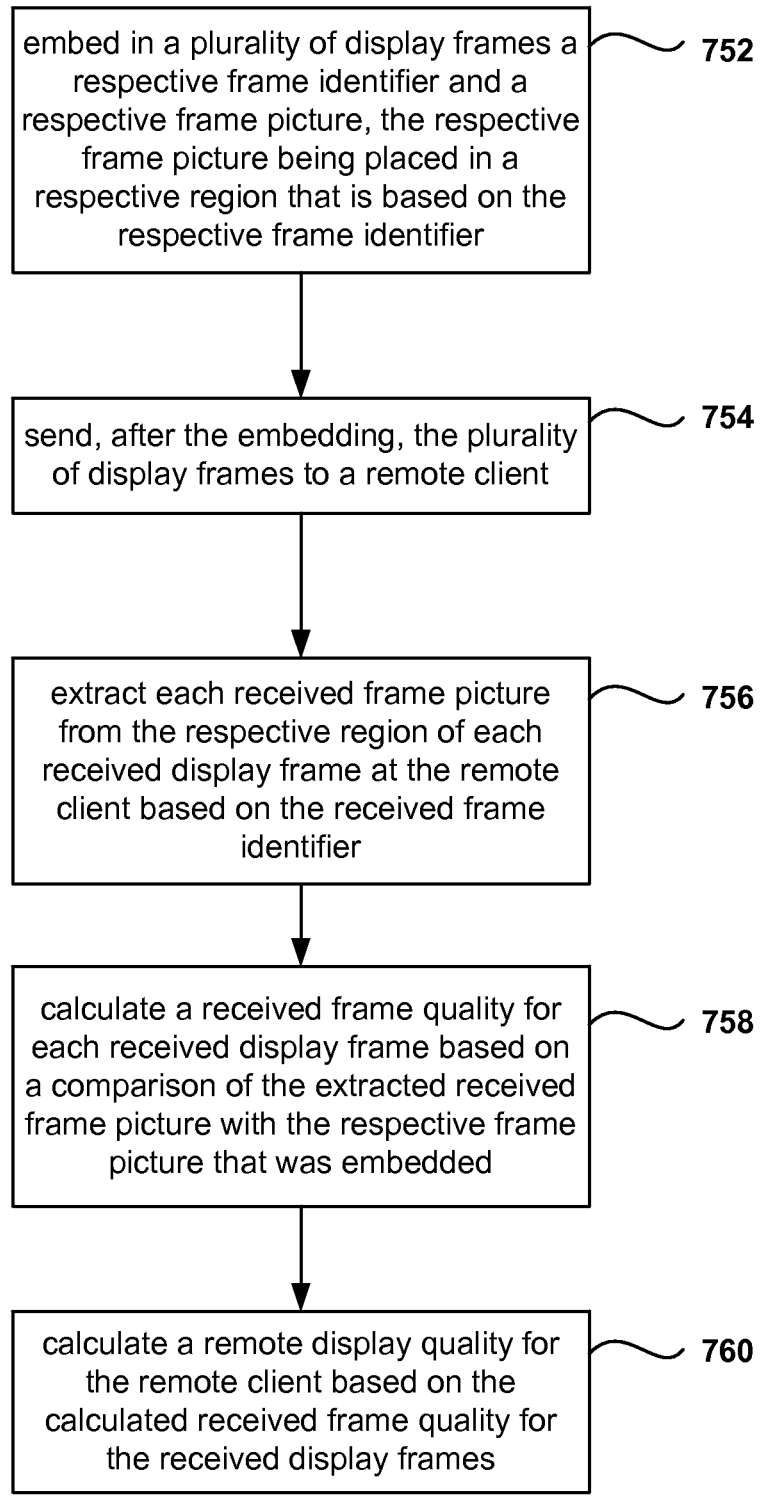
FIG. 7B is a flowchart for calculating a remote display performance, in accordance with one embodiment.

FIG. 7B is a flowchart for calculating a remote display performance, in accordance with one embodiment. In operation 752, a plurality of display frames are modified to embed a respective frame identifier and a respective frame picture in each of the display frames. The respective frame picture is placed in a respective region that is based on the respective frame identifier. In one embodiment, the location of each frame picture varies from frame to frame, where frame pictures from consecutive frames to not have overlapping pixels on the display.

From operation 752, the method flows to operation 754 where the plurality of display frames (after embedding the frame identifier and the frame pictures) are sent to a remote client. From operation 754, the method flows to operation 756 where each received frame picture is extracted, at the remote client, from the respective region of each received display frame based on the received frame identifier.

From operation 756, the method flows to operation 758 where performance quality metrics are calculated. In one embodiment, the calculations include a received frame quality for each received display frame based on the comparison of the extracted received frame picture with the respective frame picture.

From operation 758, the method flows to operation 760 where a second performance quality metric is calculated. The second performance quality metric identifies the remote display quality for the remote client, and is calculated based on the calculated received frame quality for the received display frames. In one embodiment, the operations of the method are executed by a processor.

Figure 8:
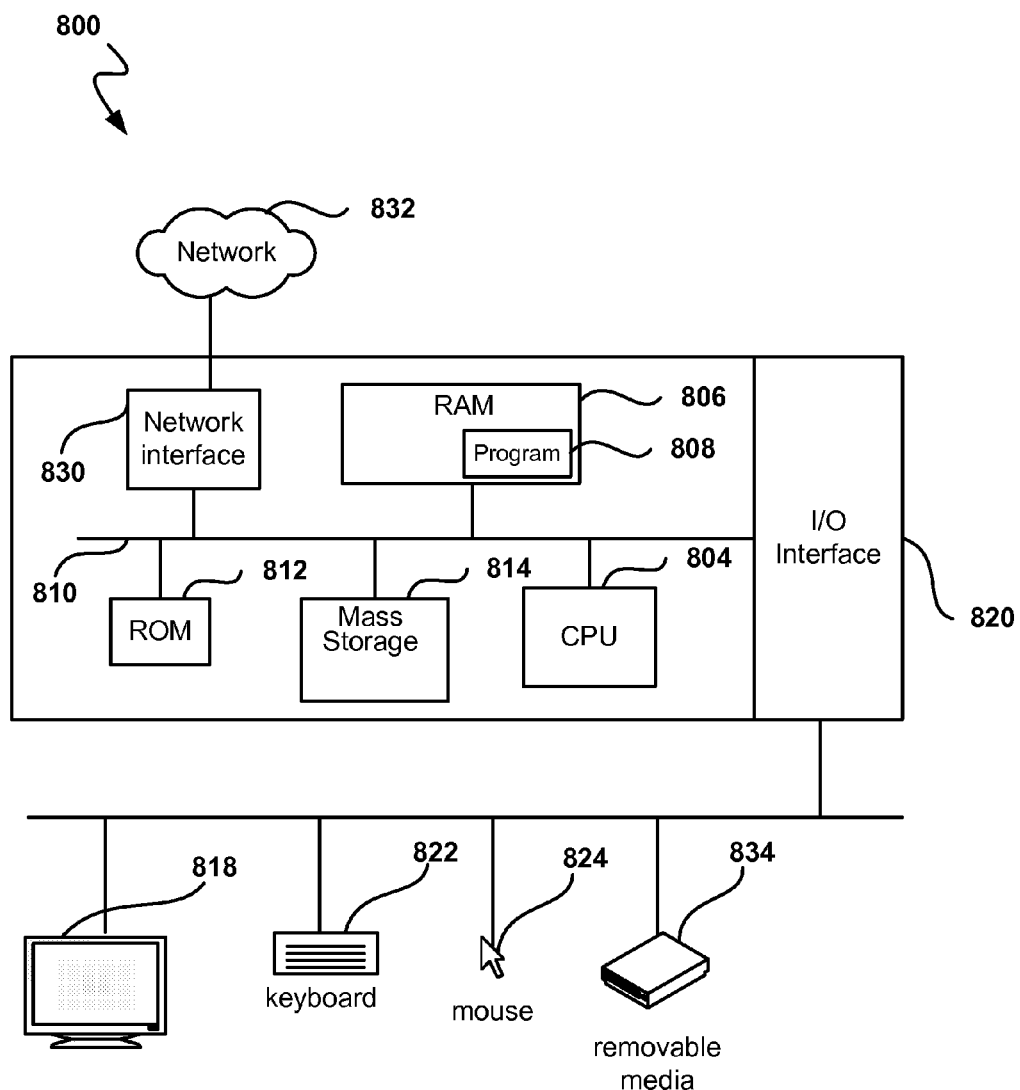
FIG. 8 is a simplified schematic diagram of a computer system for implementing embodiments presented herein.

FIG. 8 is a simplified schematic diagram of a computer system for implementing embodiments presented herein. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 804, which is coupled through bus 810 to random access memory (RAM) 806, read-only memory (ROM) 812, and mass storage device 814. Program 808 resides in random access memory (RAM) 806, but can also reside in mass storage 814. Program 808 may include a performance manager program, such as the display performance application 112 of FIG. 2.

Mass storage device 814 represents a persistent data storage device such as a floppy disc drive or a fixed disc drive, which may be local or remote. Network interface 830 provides connections via network 832, allowing communications with other devices. It should be appreciated that CPU 804 may be embodied in a general-purpose processor, a special purpose processor, or a specially programmed logic device. Input/Output (I/O) interface provides communication with different peripherals and is connected with CPU 804, RAM 806, ROM 812, and mass storage device 814, through bus 810. Sample peripherals include display 818, keyboard 822, cursor control 824, removable media device 834, etc.

Display 818 is configured to display the user interfaces described herein, such as remote desktop view 130 from FIG. 2. Keyboard 822, cursor control 824, removable media device 834, and other peripherals are coupled to I/O interface 820 in order to communicate information in command selections to CPU 804. IL should be appreciated that data to and from external devices may be communicated through I/O interface 820.

Embodiments may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although virtualization operations can take on many forms, several concepts are important to ensure that physical constructs of physical machines are properly transferred to virtual machines. With this in mind, and by way of reference, more information on virtual system and methods can be found in U.S. patents owned by the assignee of the present application, VMware, Inc. Thus, U.S. Pat. Nos. 6,397,242, 6,496,847, 7,069,413, 7,356,679, and US Published Application 2008/0244028 A1, are each incorporated by reference for all purposes.

For completeness, reference is made to an example server system, that is referred to by the trademark ESX™, which is provided by VMware, of Palo Alto, Calif. However, the methods, systems and embodiments are not limited to any one brand of server or virtualization servers. The example ESX(x) server is a hypervisor that partitions physical servers in multiple virtual machines. Each virtual machine may represent a complete system, with processors, memory, networking, storage and BIOS. VMware ESX enables multiple virtual machines to: (a) share physical resources, (b) run unmodified operating systems and applications, and (c) run the most resource-intensive applications side by side on the same server. Other servers made by other suppliers can have similar functionality or more or less functionality, depending on their target product. Accordingly, the systems, methods and computer readable media can be practiced using any product, software, or hardware configuration.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method comprising:
    receiving at a client device a plurality of display frames for an application executing on a virtual machine of a host device and displayed on a virtual desktop of the client device;
    detecting performance data in one or more frames of the received display frames, where the one or more frames have been modified by the host device to embed data for measuring performance; and
    calculating a remote display quality for the application at the client device based on the detected performance data, wherein the detected performance data is based on the respective data for measuring performance extracted from the one or more display frames, wherein the respective data extracted from each of the one or more display frames includes a frame identifier and a frame picture.

2. The method of claim 1, wherein the data for measuring performance further includes a frame number encoded in pixels of the display image.

3. The method as recited in claim 2, wherein each bit of the frame number is encoded in an area encompassing a plurality of pixels, each pixel in the area having a same color value, the pixels having a first value to encode a binary 0 and having a second value to encode a binary 1.

4. The method as recited in claim 3, wherein calculating the remote display quality further includes:
    calculating a frame rate received at the client device based on frame numbers encoded in two or more display frames.

5. The method of claim 1, wherein the frame identifier is associated with a particular location in the display image, wherein the location identifies a location associated with the corresponding frame picture inserted for that display frame.

6. The method of claim 1, wherein the frame identifier is used to determine an identity of an associated frame picture based on an image identity table that associated frame numbers with image identities.

7. The method of claim 1, wherein calculating the remote display quality includes performing a peak signal to noise ratio calculation for the display image and a corresponding reference image.

8. The method of claim 1, wherein the one or more frames have been modified by the host device in response to detecting one or more calls from the application, each call causing an update of a particular display image.

9. A system comprising:
    a client device including one or more computers having one or more processors and one or more memories, the client device configured to perform operations comprising:
    receiving a plurality of display frames for an application executing on a virtual machine of a host device and displayed on a virtual desktop of the client device;
    detecting performance data in one or more frames of the received display frames, where the one or more frames have been modified by the host device to embed data for measuring performance; and
    calculating a remote display quality for the application at the client device based on the detected performance data, wherein the detected performance data is based on the respective data for measuring performance extracted from the one or more display frames, wherein the respective data extracted from each of the one or more display frames includes a frame identifier and a frame picture.

10. A method comprising:
    detecting one or more calls from an application executing on a virtual machine each call causing an update of a display image;
    in response to the detecting, embedding data for measuring performance in each of one or more display frames of the display image, wherein a modified display frame is generated for each frame with embedded data;
    transmitting display frame including one or more modified display frames to a remote client device; and calculating a remote display quality for the application at the remote client based on received performance data from the remote client, wherein the received performance data is based on the respective data for measuring performance extracted from the one or more modified display frames, wherein the respective data for each modified display frame includes a reference image.

11. The method of claim 10, wherein detecting calls from the application further includes:
modifying program instructions to be executed when the calls are invoked to transfer program control to a performance module when the calls are made by the application.

12. The method as recited in claim 11, wherein embedding data further includes: adding the data for measuring performance in the one or more display frames; and invoking the call after adding the data.

13. The method of claim 12, wherein invoking the call further includes:
executing the program instructions that were modified; and
transferring control to program instructions of the call that logically follow the executed program instructions that were modified.

14. The method of claim 10, further including: trapping a plurality of functions in an application programming interface, provided for rendering images in response to the calls, to measure display performance when any of the plurality of functions is invoked by the application.

15. The method of claim 10, wherein the data for measuring performance further includes a frame number encoded in pixels of the display image.

16. The method of claim 15, wherein each bit of the frame number is encoded in an area encompassing a plurality of pixels, each pixel in the area having a same color value, the pixels having a first value to encode a binary 0 and having a second value to encode a binary 1.

17. The method of claim 16, wherein calculating the remote display quality further includes:
calculating a frame rate received at the client device based on frame numbers encoded in the plurality of modified display frames.

18. The method of claim 10, wherein the data for measuring performance includes a respective frame number encoded in pixels of corresponding modified display frames of the display image.

19. The method of claim 10, further including: receiving a trigger to start measuring remote display performance.

20. The method of claim 19, wherein the trigger is selected from a group consisting of an administrator command, a user selecting an option to measure performance, a network packet received, or an invocation of a performance measurement program.

* * * * *